(No Model.) 2 Sheets—Sheet 1.

J. DRONSFIELD.
DIFFERENTIAL MOTION MECHANISM.

No. 500,322. Patented June 27, 1893.

Witnesses
E. H. Sturtevant
A. R. Dunne

Inventor
James Dronsfield
By his Atty (No Model.)   2 Sheets—Sheet 2.

J. DRONSFIELD.
DIFFERENTIAL MOTION MECHANISM.

No. 500,322.   Patented June 27, 1893.

Witnesses.
E. K. Sturtevant.
A. R. Dunne.

Inventor
James Dronsfield.
By his Atty.
Richards

UNITED STATES PATENT OFFICE.

JAMES DRONSFIELD, OF OLDHAM, ENGLAND.

DIFFERENTIAL-MOTION MECHANISM.

SPECIFICATION forming part of Letters Patent No. 500,322, dated June 27, 1893.

Application filed September 26, 1892. Serial No. 446,941. (No model.)

*To all whom it may concern:*

Be it known that I, JAMES DRONSFIELD, a subject of the Queen of Great Britain, residing at Oldham, Lancaster county, England, have invented a new and useful Improvement in Differential-Motion Mechanism, of which the following is a specification.

My invention relates to differential apparatus, intended to be used in the transmission of rotary motion, at a reduced rate of speed, from one shaft, or body, to another shaft, or body, both revolving on the same axial line.

For convenience of description, I will suppose that the motion is to be used in transmitting a reduced speed from one shaft to another. Upon the second motion shaft I fix an internal toothed wheel, with which meshes an external toothed wheel, or pinion, of smaller diameter, which revolves upon a bearing which is eccentric to the two shafts, to the extent necessary to enable the two wheels to mesh together. Upon the first motion shaft is fixed a driver, from which a revolving motion is imparted to the external wheel. It is necessary that there should be sliding connection between the parts, in consequence of the eccentricity of the external wheel. If the connection between the driver and the wheel were direct, the motion of the second motion shaft would be irregular. To obviate such irregularity, I interpose between the driver and the wheel a transmitter, which revolves upon a bearing having half the eccentricity of the bearing for the wheel, and I establish sliding connections, on opposite sides of the axis, between the driver and the transmitter, and between the transmitter and the external wheel. The eccentrics are on a carrier which is prevented from revolving.

The invention is illustrated by the accompanying drawings.

Figure 1:
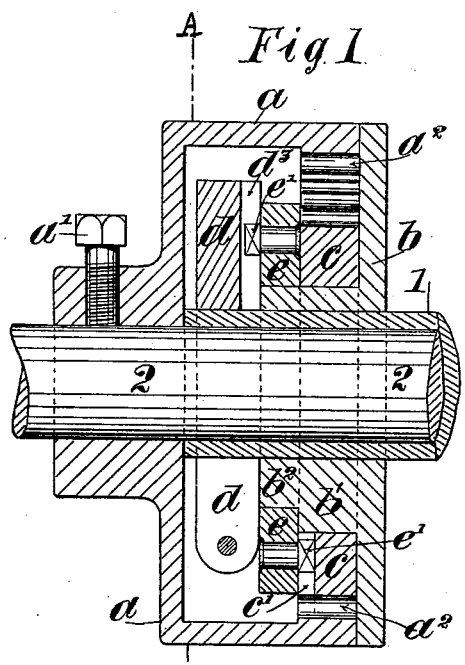
Figure 2:
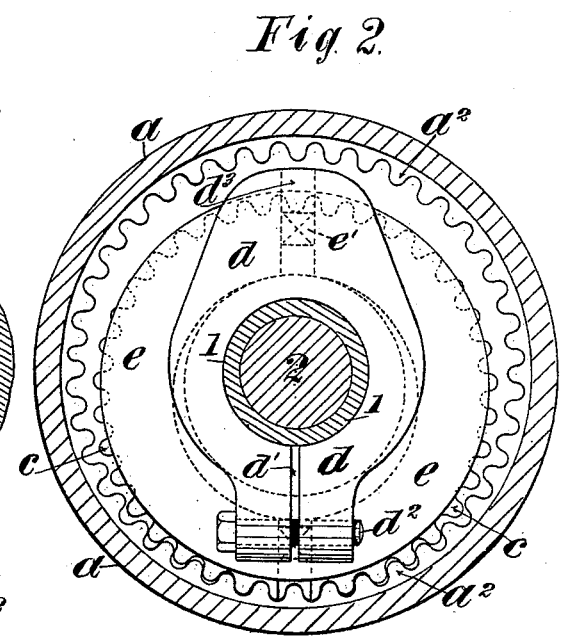
Figure 3:
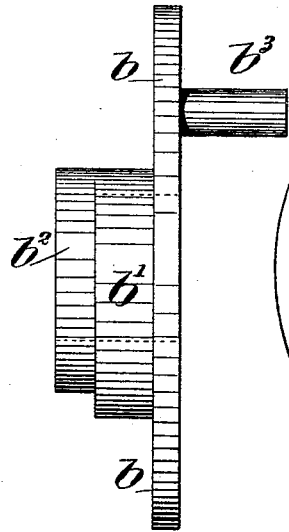
Figure 4:
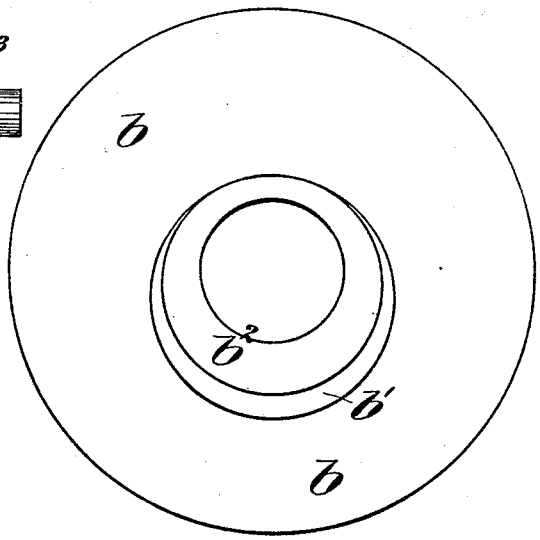
Figure 5:
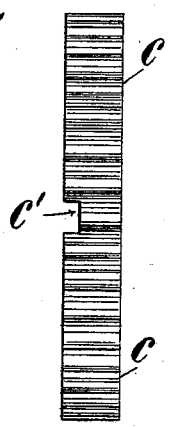
Figure 6:
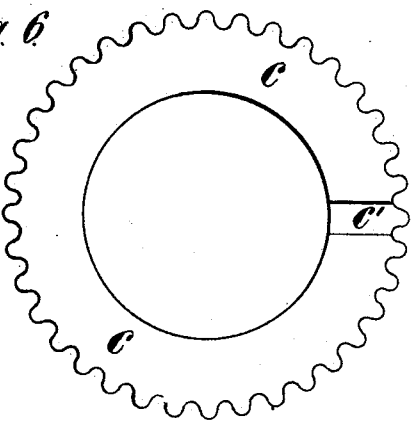
Figure 7:
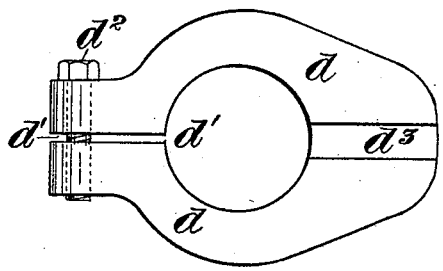
Figure 8:
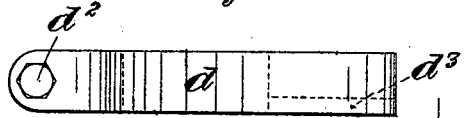
Figure 9:
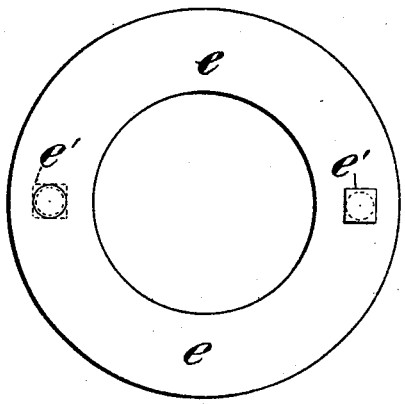
Figure 10:
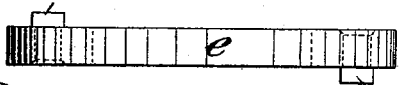
Figure 11:
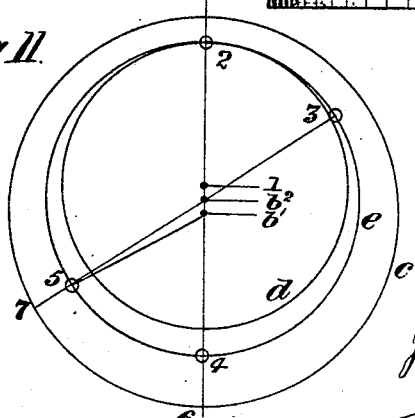

In the drawings:—Figure 1 is a diametric section of the complete motion. Fig. 2 is a section in the line A. B. in Fig. 1. Fig. 3 is a side view of the eccentric carrier. Fig. 4 is a front view of the same. Fig. 5 is an edge view of the external wheel. Fig. 6 is a face view of the same. Fig. 7 is a face view of the driver. Fig. 8 is an edge view of the same. Fig. 9 is a face view of the transmitter. Fig. 10 is an edge view of the same. Fig. 11 is a diagram illustrating the action of the parts.

In Figs. 1 and 2, the first motion shaft is represented by 1, and the second motion shaft by 2, shaft 1 being the driver, and imparting a slow motion to shaft 2. In the example, shaft 1 is hollow at the part represented, and shaft 2 is mounted to revolve within shaft 1, but for some purposes this need not be the case, as the two shafts might come end to end, that is to say, shaft 2 might extend only far enough to be secured to the shell $a$. This shell is secured by a screw $a'$, to the shaft 2, and is formed with a ring of internal teeth $a^2$. Upon shaft 1 is mounted the eccentric carrier $b$, separately represented by Figs. 3 and 4. Upon this part is formed two eccentrics $b'$, and $b^2$. The distance from the axis of the shafts 1, and 2, to the center of the bearing $b'$, is equal to the difference between the radii of the wheels $a^2$, and $c$. Upon the eccentric $b'$ is loosely mounted the externally toothed wheel $c$, which meshes with the ring of teeth $a^2$, and is formed with a radial groove $c'$. The eccentric-carrier $b$, is prevented from revolving, so that if the wheel $c$, be revolved, the shell $a$, and as a consequence the shaft 2, will revolve at a slower speed. To prevent the eccentric carrier from revolving, it is provided with a projecting pin $b^3$, which may enter a hole in a fixed part of the machinery to which the motion may be applied, or the pin, or a part fixed thereon, may bear against a fixed point.

It will be understood that the method of preventing the rotation of the eccentric carrier, does not form any important part of the invention.

The wheel $c$, is revolved by means of a driver $d$, which is fixed upon the end of the shaft 1, and is separately represented by Figs. 7 and 8. For convenience of fixing upon the shaft, this driver is split at $d'$, and is provided with a tightening screw $d^2$. By tightening this screw, the driver is firmly secured to the shaft. The driver is formed with a radial groove at $d^3$, as in the case of the groove $c'$, in the wheel $c$. Motion is transmitted from the driver $d$, to the wheel $c$, through the transmitter $e$, which is separately represented by Figs. 9 and 10. This transmitter is provided on each side with a projecting stud $e'$, $e'$, each stud having a square head to fit one or the other of the grooves $c'$, $d^3$, and with a round shank which fits loosely in a hole drilled in the transmitter. The two studs are situated on a line passing through the center of the transmitter, and on opposite sides of such center, as clearly shown in the drawings. The transmitter is mounted upon the second eccentric $b^2$, one stud engaging with the groove $c'$, and the other stud with the groove $d^3$, as seen in Fig. 1. The shanks of the studs being free to turn in their bearings, the square studs can accommodate themselves to the movements of the parts. When the shaft 1, is rotated, the driver $d$, rotates the transmitter, and the latter rotates the wheel $c$, which gives motion to the case $a$, and thereby to the shaft 2. As the transmitter revolves, the stud $e'$, slides in the groove $c'$, nearer to and farther from the axis of the wheel $c$, and without some compensation would impart an irregular motion to the said wheel. The transmitter acts as a compensator. The bearing $b^2$, upon which the transmitter is mounted has half the eccentricity of the bearing $b'$, and the axis of the bearing $b^2$, is on the radial line from the axis of the shafts 1 and 2, to the axis of the bearing $b'$, and as the studs $e'$ are on opposite sides of the axial line of the transmitter, it follows that when one stud is nearing the center of the wheel $c$, the other stud will be moving away from such center. The effect of this is that, when the transmitter would be tending to drive the wheel $c$, more quickly, the driver $d$, would tend to revolve the transmitter more slowly, the two variations balancing each other, so that the wheel $c$, revolves at a regular speed. This is proved by the diagram Fig. 11, in which $c$, represents the pitch line of the wheel $c$, revolving on the center $b'$, $e$, is the path of the studs $e'$, around the center $b^2$, and $d$, is a circle around the center, which represents the axis of the shaft 2 and driver $d$. The driver $d$, in making the sixth of a revolution, would move its stud from 2 to 3, the other stud moving from 4 to 5, whereby a point on the circle $c$, would be turned a sixth of a revolution, from 6 to 7.

I claim as my invention—

1. In combination, in a differential motion mechanism, the internally toothed wheel $c$, the driven shaft connected thereto, the driving shaft, the driver $d$, on said shaft, the externally toothed wheel C between the driver and the internally toothed wheel and journaled eccentrically of the internally toothed wheel, the rotary reciprocating transmitter $e$ between the driver and the externally toothed wheel and having sliding connection with both, said transmitter being also eccentrically journaled relative to the internally toothed wheel, and the two eccentric bearings $b'$, $b^2$ for the externally toothed wheel and transmitter, respectively, substantially as described.

2. The differential motion mechanism, consisting of an internally toothed wheel, an externally toothed wheel mounted on a fixed axis eccentric to the axis of the internally toothed wheel, a driver revolving on the same axial line as the internally toothed wheel, and a transmitter revolving on an axis which is on the radial line from the axis of the internally toothed wheel to the axis of the externally toothed wheel, and half way between the two axes, the transmitter receiving revolving motion from the driver, and transmitting motion to the externally toothed wheel, substantially as set forth.

3. The combination for transmitting rotary motion at a reduced speed from one body to another on the same axial line; consisting of an externally toothed wheel revolving on a fixed axis eccentric to the axes of the said bodies, and meshing with an internally toothed wheel attached to the driven body, a driver on the driver body, and a transmitter mounted on an axis which is also eccentric to the axes of the said bodies, and is in a line with the last named axis, and the axis of the externally toothed wheel, and half way between the two axes, such transmitter being connected by means of pins or blocks and grooves with the said driver, and the externally toothed wheel, substantially as set forth.

In witness whereof I have hereunto set my hand in presence of two witnesses.

JAMES DRONSFIELD.

Witnesses:
JOSHUA ENTWISLE,
RICHARD W. IBBERSON.